March 20, 1956     E. E. RICE     2,738,610
FISH LURE
Filed Aug. 9, 1954
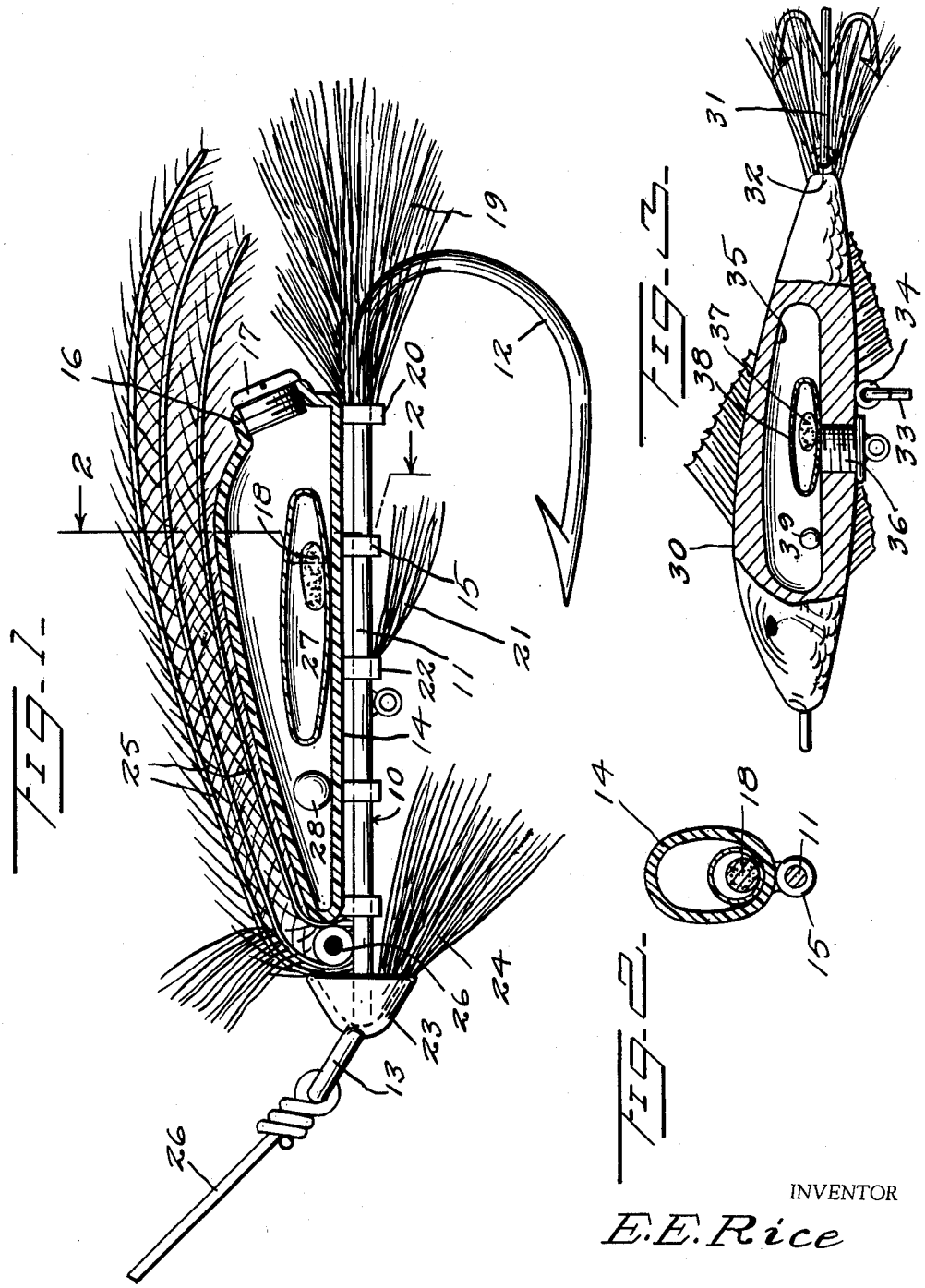
INVENTOR
*E. E. Rice*
BY *Kimmel & Crowell*
ATTORNEYS

United States Patent Office 2,738,610
Patented Mar. 20, 1956

2,738,610

FISH LURE

Edwin Everett Rice, Hamilton, Ohio

Application August 9, 1954, Serial No. 448,412

3 Claims. (Cl. 43—26.2)

This invention relates to fish lures. The principal object of which is to provide a fish lure in the form of a fly, bug, plug imitating a minnow, a frog, or a crawfish, containing a hollow chamber into which there is inserted a Mexican jumping bean to agitate said lure simulating natural life thereto. Also means, consisting of a small metal, plastic or glass ball, is inserted, if desired, into the chamber to activate the jumping bean and cause it to jump as the ball strikes the bean's capsule or the housing it is contained in, after being inserted into said chamber along with said ball.

Another object of this invention is to provide a fish lure embodying a hook which has mounted thereon feathers and/or hair with a housing fixed to the shank of the lure simulating the body of a fly or other insect. The housing is hollow and has a removable plug at one end and a Mexican jumping bean mounted in the housing so that when the bean jumps or moves the lure will be agitated, and in this manner the lure will have the appearance of a fly or insect struggling in the water, or if the jumping bean is applied to a plug, a minnow, frog, crawfish, or other object, it will cause such lure to be animated by the jumping of the bean within it, whereby a lifelike simulation is produced without use of a jerk or movement by the fisherman with his attached line, thus causing fish to be induced to strike.

In the drawing:

Figure 1 is a longitudinal section, partly in elevation, of a fish lure constructed according to an embodiment of this invention.

Figure 2 is a sectional view taken on the line 2—2 of Figure 1.

Figure 3 is a detail side elevation, partly in section, of a modified form of this invention.

Referring to Figures 1 and 2, the numeral 10 designates generally a fish hook which is formed with a shank 11 having a hook member 12 at one end thereof and an eye 13 at the other end.

A substantially ovoidal housing 14 is loosely mounted on the shank 11 by means of eyes or rings 15. The housing 14 is substantially ovoidal in transverse section and tapers from one end to the other with the larger end adjacent the hook member 12. The housing 14 is formed with a boss 16 at the rear large end thereof in which a threaded plug 17 removably engages.

A bean 18 is loosely disposed in a capsule 27, and the bean 18 is preferably of the type known as a Mexican jumping bean. A ball 28 is loose in housing 14 and is adapted upon movement of the lure to strike capsule 27 so as to agitate the bean 18 and cause the bean to move.

The lure also comprises a streamer 19 formed of hair, fibers, or the like, secured as at 20 to the rear portion of the shank 11 and intermediate strands 21 are secured by means of an eye or ring 22 to the shank 11.

A cap 23 is secured to the forward end of the shank 11, and a forward bunch of hair or fibrous strands 24 extend from the cap 23.

A plurality of rearwardly-extending longitudinally bowed feathers 25 are secured to the forward end of the housing 14 and to the cap 23. A depending eye is fixed to shank 11 intermediate the ends thereof to receive a sinker so as to cause the lure to sink beneath the surface of the water.

In the use of this lure the eye 13 has a fish line 26 secured thereto and the lure may be of the type which will be disposed on substantially the surface of the water. As the lure lies on the water surface the movement of the jumping bean 18 will effect agitation of the housing 14 and the other elements carried by the hook 10 so as to give the appearance of an insect trapped on the surface of the water.

The housing 14 may be made of aluminum, plastic, or other suitable material shaped and molded to resemble a fly, minnow, frog, or other bait commonly used to catch fish and painted or colored as nearly as possible to the natural color of the bait.

The bean 18 can be renewed as may be desired or necessary by unscrewing the plug 17 from the boss 16 and dumping the capsule 27 therethrough. Thereafter a new capsule 27 having a new bean 28 is inserted through the boss 16 and the plug 17 is then replaced through the boss.

Referring to Figure 3, there is disclosed a modified form of this invention wherein a plug or body 30 is constructed to simulate a minnow. The body 30 has a multiple hook member 31 secured to an eye 32 at the rear thereof, and a similar multiple hook 33 is secured to an eye 34 on the bottom of the body 30.

An elongated chamber 35 is formed in the body 30, and a plug 36 is threaded into the bottom of the body 30 and provides a means whereby a jumping bean 37 in a capsule 38 may be inserted in the chamber 35. A bean agitating ball 39 is loosely disposed in chamber 35 and is adapted upon movement of the body 30 to strike capsule 38 so as to thereby agitate the bean 37.

What is claimed is:

1. A fish lure comprising a fish hook having an elongated shank and provided with a hook member at one end thereof, an elongated substantially hollow closed housing, said housing extending longitudinally of said shank means loosely connecting said housing on said shank, a substantially hollow capsule having a Mexican jumping bean loosely positioned in said housing, a reactor member loosely disposed within said housing, said reactor being adapted to intermittently engage said capsule, and means for connecting the other end of said shank to a fishing line.

2. A fish lure as defined in claim 1 and said reactor member comprising a substantially spherical ball.

3. A fish lure as defined in claim 1, said housing being substantially ovoidal in configuration and having the larger end thereof positioned adjacent said hook, said housing having an aperture formed therein adapted to receive said capsule and said reactor member therethrough, and a closure member for said aperture.

References Cited in the file of this patent

UNITED STATES PATENTS

| 934,087 | Moran | Sept. 14, 1909 |
|---|---|---|
| 1,212,752 | Fiebig | Jan. 16, 1917 |
| 1,419,903 | Bailey | June 13, 1922 |
| 1,878,015 | Steffensen | Sept. 20, 1932 |
| 2,134,079 | Fentress | Oct. 25, 1938 |
| 2,270,487 | Withey | Jan. 20, 1942 |
| 2,599,128 | Roberts | June 3, 1952 |
| 2,619,772 | Dikszas | Dec. 2, 1952 |
| 2,659,176 | Wenger | Nov. 17, 1953 |

OTHER REFERENCES

Pages 4 and 5 of the booklet "How To Tie Flies," by E. C. Gregg.